United States Patent [19]

Blakely

[11] Patent Number: 5,231,435
[45] Date of Patent: Jul. 27, 1993

[54] AERIAL CAMERA MOUNTING APPARATUS

[76] Inventor: Bruce W. Blakely, 770 Pine La., San Rafael, Calif. 94903

[21] Appl. No.: 729,062

[22] Filed: Jul. 12, 1991

[51] Int. Cl.⁵ ............................................. G03B 39/00
[52] U.S. Cl. ...................................... 354/74; 354/81; 354/293
[58] Field of Search ...................... 354/74, 81, 65, 293

[56]   References Cited
U.S. PATENT DOCUMENTS

| | | | |
|---|---|---|---|
| 1,423,364 | 7/1922 | Sharpe | 354/74 |
| 4,569,579 | 2/1986 | Kangas | 354/293 |
| 5,055,864 | 8/1991 | Slikkers | 354/81 |

Primary Examiner—Richard A. Wintercorn
Assistant Examiner—David M. Gray
Attorney, Agent, or Firm—Larry D. Johnson

[57]   ABSTRACT

An aerial camera mounting apparatus includes a bracket member to fit within a segment of or the entire perimeter edge of an aircraft window opening, a retaining system to secure this bracket to the window edge, and a camera lens support member connected to the bracket to position a camera lens generally within the window opening. Thus, the apparatus may be installed into an existing hinged or otherwise opening-type aircraft window, such that the bracket attaches to one or all the edges of the pre-existing window frame. Alternatively, the apparatus may be installed into a hole previously cut in an otherwise fixed window, with the bracket similarly attaching to one or all of the edges of the formed cut.

12 Claims, 4 Drawing Sheets

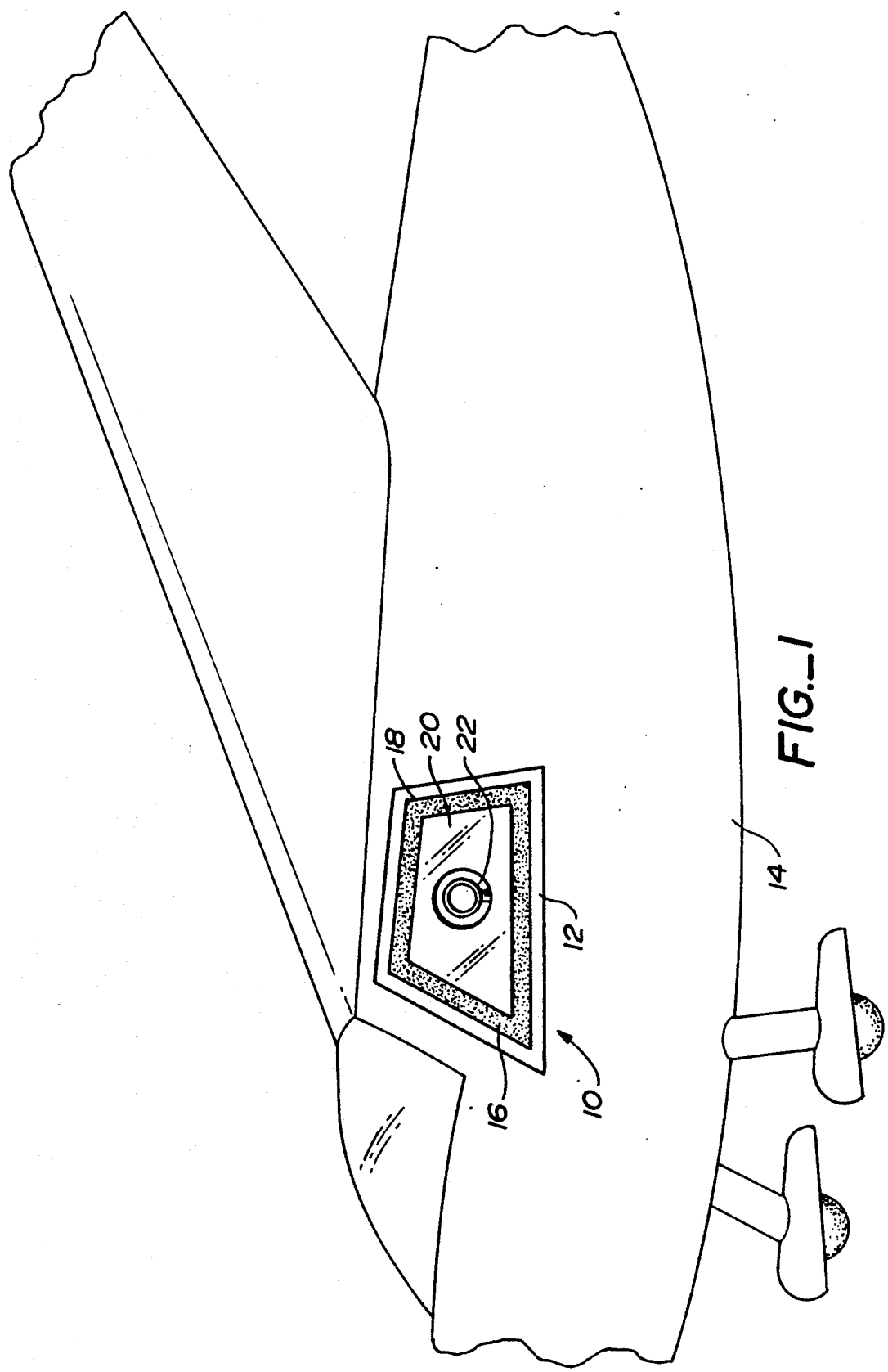

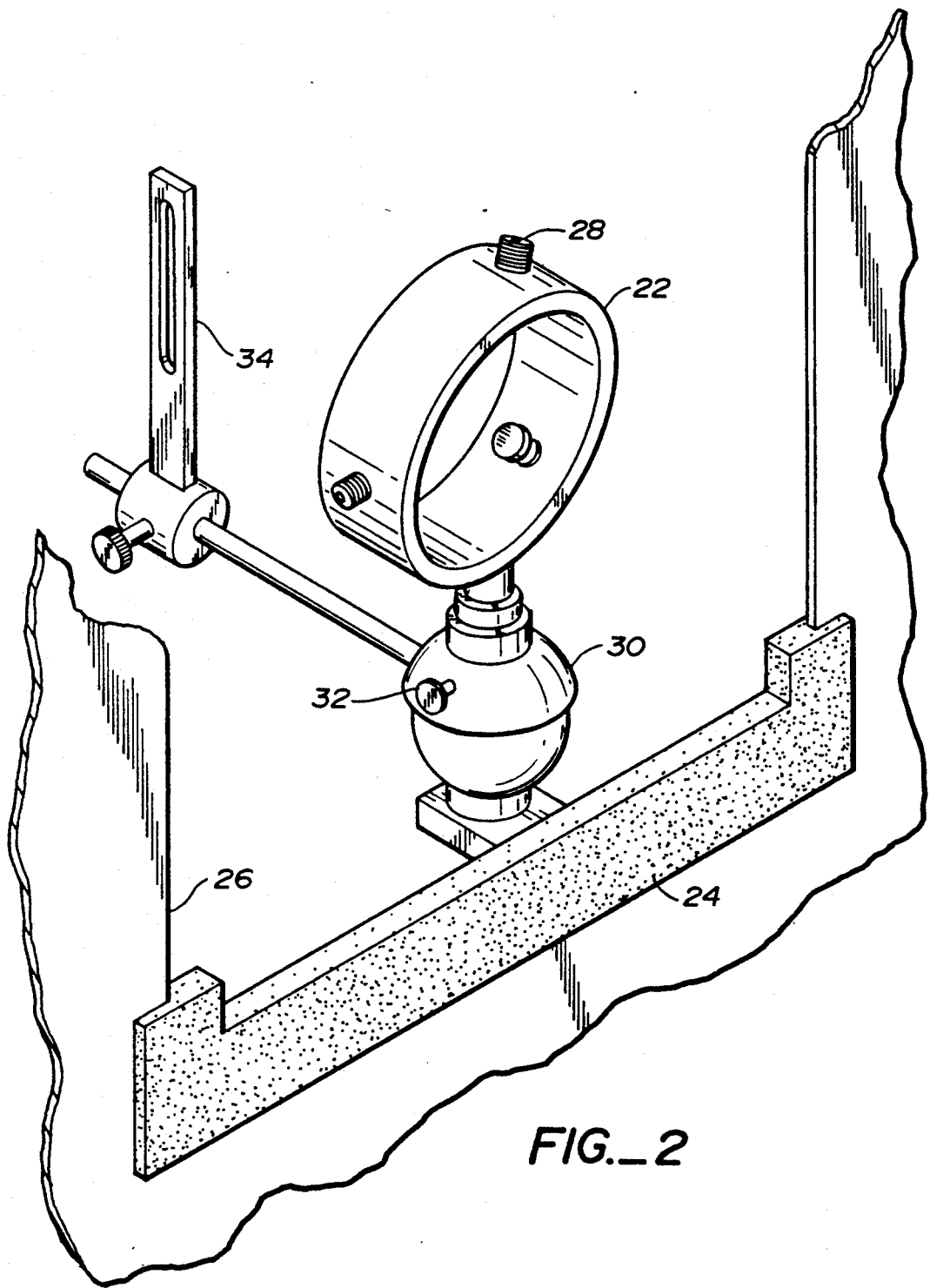
FIG._2

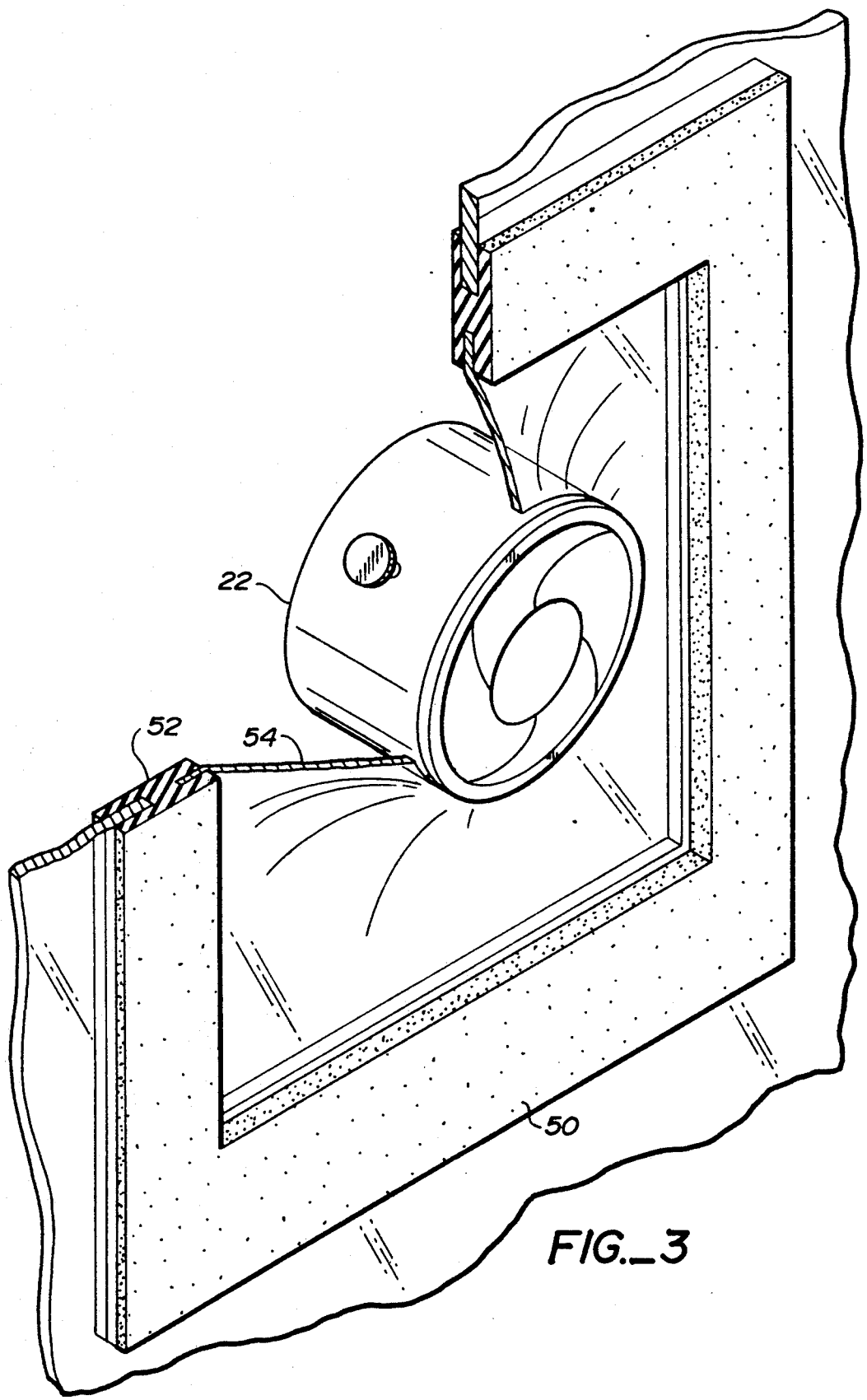
FIG._3

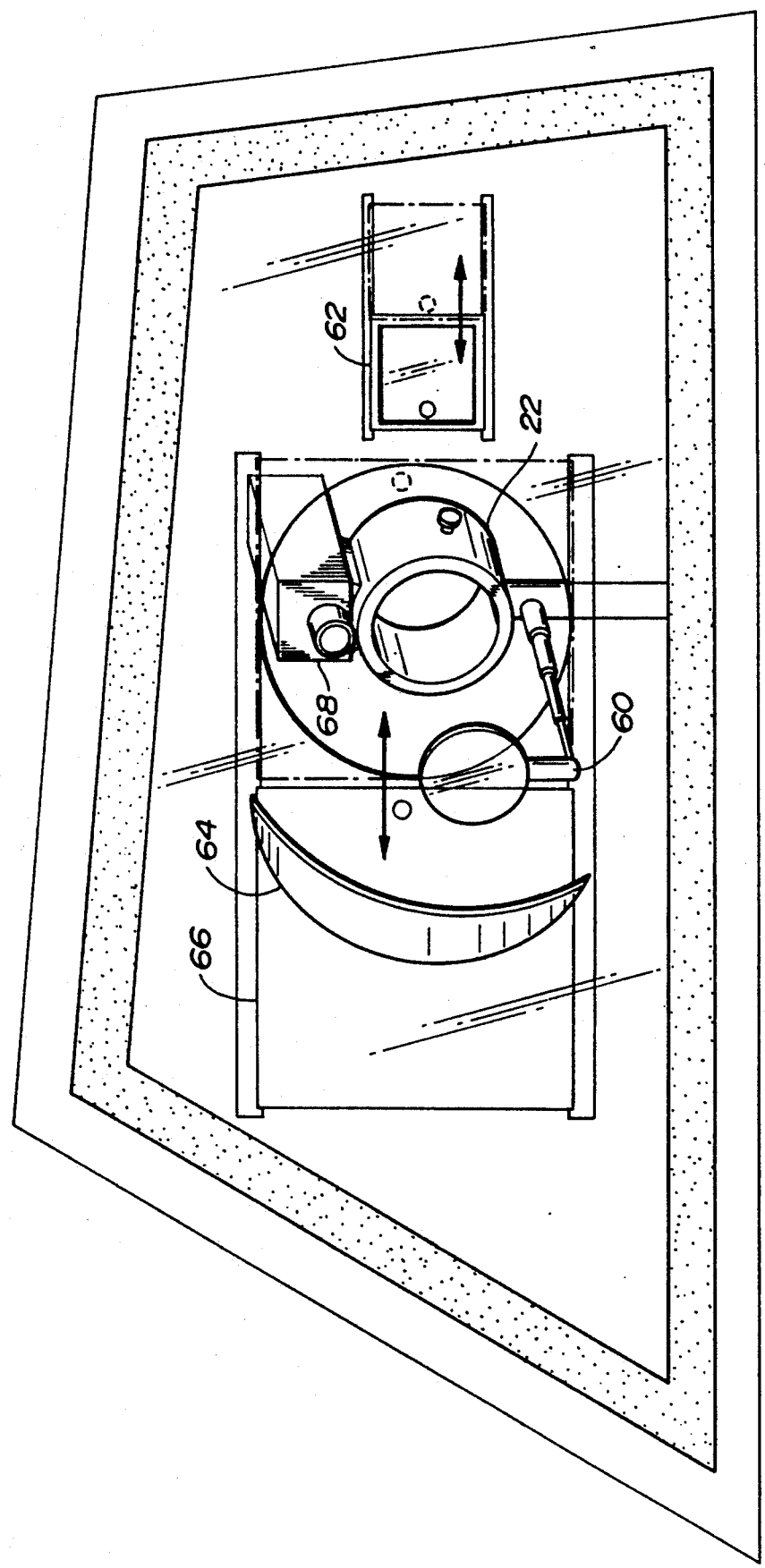
FIG._4

AERIAL CAMERA MOUNTING APPARATUS

BACKGROUND OF THE INVENTION

1. Field of the Invention

This invention relates generally to aerial photography equipment, and more specifically to an improved mounting apparatus for cameras used in aerial photography.

2. Description of the Prior Art

Aerial photography is an important and expanding field. As such, numerous devices have been developed to assist aerial photographers to mount and/or control their photographic equipment on an airplane. However, most known devices deal with the issues of camera stability and accuracy in mapping, and accordingly are concerned primarily with gyroscopic issues. Few known devices deal with the issues of window reflection, refraction, filtration, tinting and distortion. Furthermore, most do not provide for manual operation of a camera, or allow the photographer to view through the camera. Still further, most deal with vertical photography and do not allow for oblique shots, and those which do allow for oblique shots are complicated, technical, electronically controlled and expensive. Finally, most are not suitable for light aircraft installations or for single pilot operations.

SUMMARY OF THE INVENTION

The aerial camera mounting apparatus of this invention is designed to facilitate and enhance motion picture and still photography from moving vehicles, with particular suitability for single pilot aerial photography applications.

In its most basic and fundamental form, the apparatus comprises the following elements: a bracket member to fit within a segment of or the entire perimeter edge of an aircraft window opening, retaining means to secure this bracket to the window edge, and a camera lens support member connected to the bracket to position a camera (lens) generally within the window opening. Thus, the apparatus may be installed into an existing hinged or otherwise opening-type aircraft window, such that the bracket attaches to one or all the edges of the pre-existing window frame. Alternatively, the apparatus may be installed into a hole previously cut in an otherwise fixed window, with the bracket similarly attaching to one or all of the edges of the formed cut. Furthermore, the apparatus may include a "inner window" filling at least some portion of the void between the bracket and the camera lens support. This inner window may be made of a rigid, optically transparent material such as flexiglass or the like, or may be of a flexible material such as clear plastic.

The preferred embodiment may also include: a telescoping ball and socket-type pivotable mount for the camera lens support member; a further support fixed to the bracket and adjustable to stabilize the base of the camera; wind screens to shield the camera and lens during flight; an exterior lens stabilizer and wind reduction iris; a telescoping filter mount; a hinged side window for lens and filter adjustment; and a sliding window cover.

A remote embodiment of the apparatus additionally includes a built-in parallel viewing video camera, dash-mounted real time video display monitor or heads-up windscreen imagery projector, directional control servo motors and relays, and fingertip directional and shutter controls. In its remote application, the controls must have the ability to control the device in five dimensions: pitch (tilt), yaw (azimuth), roll, zoom, and focal length.

The aerial camera mounting apparatus of this invention provides the following benefits: pilot and equipment wind protection, vibration dampening, camera stabilization, universal directional control, enhancement of light filtration, reduction of pilot/photographer workload, and ease of equipment operation. The device may optionally be employed in concert with a gyroscopic camera.

The inventive apparatus will enable pilots and photographers to engage in film, video or still photography in all meteorological conditions and in all flying attitudes, while providing rigid camera support and stability to the operator. The photographer is able to remain in the aircraft protected from the slipstream while not sacrificing photographic quality due to aircraft window refraction and reflection. The apparatus will support the weight of all photographic equipment for hands off, feather light control. The apparatus will increase comfort, reduce workload and fatigue, heighten photographic quality and increase equipment capability, while simultaneously making aerial photography appreciably safer for both single pilot photographers and professional photographer passengers.

The apparatus may be used in numerous applications, including, but not limited to, search and rescue, fish and wildlife observation, environmental survey census and control, military reconnaissance, law enforcement, customs and border surveillance, pipeline surveillance, land use management, agricultural analysis, mapping, seismic and geologic analysis, structural, engineering, and hydrological evaluation, topographic analysis, news reporting, evidence gathering, fire fighting, and scenic, artistic and pleasure photography. The apparatus is also suitable for use in other vehicles, including cars, trucks, tractors, cranes and the like.

BRIEF DESCRIPTION OF THE DRAWINGS

FIG. 1 is an exterior pictorial perspective view of an installation of a full-bracket embodiment of an aerial camera mounting apparatus of this invention as installed in an open window frame of a typical aircraft;

FIG. 2 is a partially cutaway perspective view of a partial-bracket embodiment of an aerial camera mounting apparatus of this invention, also as installed in an open window frame;

FIG. 3 is a partially cutaway perspective view of a full-bracket embodiment of an aerial camera mounting apparatus of this invention, as installed in a hole previously cut in an existing aircraft window; and FIG. 4 is an exterior pictorial perspective view of further features of the aerial camera mounting apparatus of this invention, including a telescoping filter mount, lens/filter adjustment window, wind deflection scoop, sliding window cover, and parallel video camera.

DETAILED DESCRIPTION OF A PREFERRED EMBODIMENT

FIG. 1 is an exterior pictorial perspective view of an installation of a full-bracket embodiment of an aerial camera mounting apparatus 10 of this invention as installed in an open window frame 12 of a typical aircraft 14. Apparatus 10 includes bracket 16 extending around the perimeter edge 18 of frame 12. This view further illustrates an inner window 20 generally filling the void between bracket 16 and camera lens support 22 (described infra).

FIG. 2 is a partially cutaway perspective view of a partial-bracket embodiment of an aerial camera mounting apparatus of this invention, also as installed in an open window frame. Here, partial bracket 24 is affixed to only one segment of the window frame 26, and no inner window is present. Lens support 22 comprises a cylinder of a size to accept insertion of a camera lens, and includes adjustment screws 28. Together, this cylinder and these adjustment screws may also comprise a shock absorption/vibration dampening mechanism to further stabilize the camera lens for enhanced photography. Lens support 22 is connected to bracket 24 by pivotable/telescopically adjustable ball and socket mount 30, which may include set screw 32 to fix the adjustment in a desired position. Camera body support member 34 extends from mount 30, and may also be adjustable.

FIG. 3 is a partially cutaway perspective view of a full-bracket embodiment of an aerial camera mounting apparatus of this invention, as installed in a hole previously cut in an existing aircraft window. Full bracket 50 may be retained on cut window edge 52 by virtue of its own grooved shape, fastening hardware, or the like. In addition, full bracket 50 may simultaneously provide both a seal (as here) between the existing window and padded inner window 54, as well as a shock absorption/vibration dampening mechanism to the lens support.

FIG. 4 is an exterior pictorial perspective view of further features of the apparatus, including telescoping filter mount 60, lens/filter adjustment window 62, wind deflection scoop 64, sliding window cover 66, and parallel video camera 68. The apparatus may further include a lens stabilizing "iris", that may have both fixed and flexible portions, a fixed circular central piece to form an air seal around the camera lens, and a flexible "cloak" attached to this central circle and affixed to the window to allow the camera to move. Alternatively, the iris would be a fixed piece attached to the outside end of the lens support and the cloak could surround the rear end of the lens support.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as the invention is:

1. An apparatus for mounting a camera in an aircraft, said aircraft having an occupant compartment, and an aircraft window opening comprising a frame member surrounding a movable window, said camera having a camera body and a camera lens, said apparatus comprising:
   an inner window portion configured to fit within said frame member when said movable window is displaced, said inner window portion having a central aperture;
   retaining means for securing said inner window portion within said aircraft window opening; and
   a camera lens support member connected to said aircraft window opening to position said camera lens in said inner window portion central aperture.

2. The aerial camera mounting apparatus of claim 1 wherein said aircraft window opening has a perimeter edge, and said retaining means is generally coextensive with said perimeter edge.

3. The aerial camera mounting apparatus of claim 1 wherein said inner window portion comprises a flexible material.

4. The aerial camera mounting apparatus of claim 1 wherein said camera lens support member comprises a cylinder.

5. An apparatus for mounting a camera in an aircraft, said aircraft having an occupant compartment, and an aircraft window opening comprising a hole cut in an aircraft window, said camera having a camera body and a camera lens, said apparatus comprising:
   an inner window portion configured to fit within said hole cut in said aircraft window, said inner window portion having a central aperture;
   retaining means for securing said inner window portion within said aircraft window opening; and
   a camera lens support member connected to said aircraft window opening to position said camera lens in said inner window portion central aperture.

6. The aerial camera mounting apparatus of claim 5 wherein said aircraft window opening has a perimeter edge, and said retaining means is generally coextensive with said perimeter edge.

7. The aerial camera mounting apparatus of claim 5 wherein said inner window portion comprises a flexible material.

8. The aerial camera mounting apparatus of claim 5 wherein said camera lens support member comprises a cylinder.

9. An apparatus for mounting a camera in an aircraft, said aircraft having an occupant compartment and an aircraft window opening, said camera having a camera body and a camera lens, said apparatus comprising:
   an inner window portion of a size to generally fit within said aircraft window opening, said inner window portion having a central aperture;
   retaining means for securing said inner window portion within said aircraft window opening; and
   a camera lens support member connected to said aircraft window opening by a bracket member to position said camera lens in said inner window portion central aperture, said camera lens support member including a pivotable mount comprising a ball and socket connector.

10. An apparatus for mounting a camera in an aircraft, said aircraft having an occupant compartment and an aircraft window opening, said camera having a camera body and a camera lens, said apparatus comprising:
    an inner window portion of a size to generally fit within said aircraft window opening, said inner window portion having a central aperture;
    retaining means for securing said inner window portion within said aircraft window opening; and
    a telescopically adjustable camera lens support member connected to said aircraft window opening by a bracket member to position said camera lens in said inner window portion central aperture.

11. An apparatus for mounting a camera in an aircraft, said aircraft having an occupant compartment and an aircraft window opening, said camera having a camera body and a camera lens, said apparatus comprising:
    an inner window portion comprising a rigid, optically transparent material of a size to generally fit within said aircraft window opening, said inner window portion having a central aperture;

retaining means for securing said inner window portion within said aircraft window opening; and a camera lens support member connected to said aircraft window opening to position said camera lens in said inner window portion central aperture.

12. An apparatus for mounting a camera in an aircraft, said aircraft having an occupant compartment and an aircraft window opening, said camera having a camera body and a camera lens, said apparatus comprising:

an inner window portion of a size to generally fit within said aircraft window opening, said inner window portion having a central aperture;

retaining means for securing said inner window portion within said aircraft window opening;

a camera lens support member connected to said aircraft window opening to position said camera lens in said inner window portion central aperture; and a camera body support member connected to said aircraft window opening to support said camera body within said aircraft occupant compartment.

* * * * *